April 8, 1952     L. W. CAUGHMAN     2,591,916
SELF-LOCKING TRAILER COUPLING UNIT
Filed June 10, 1950
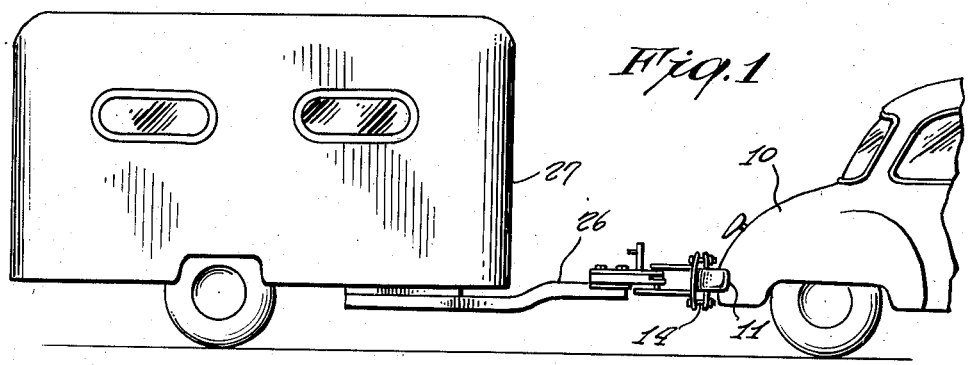
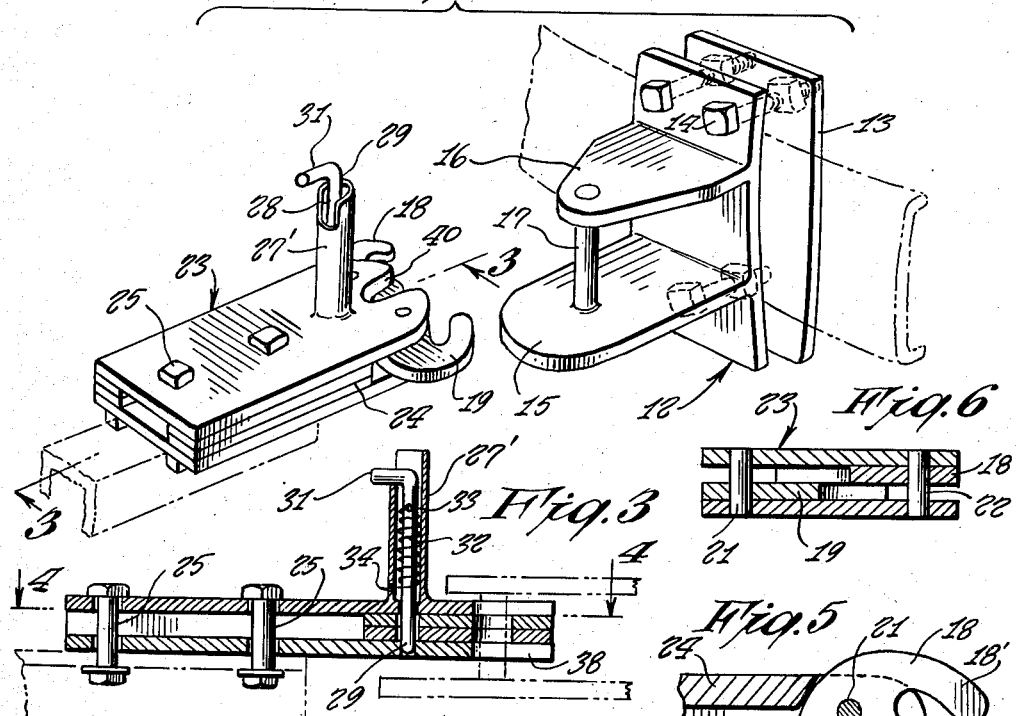
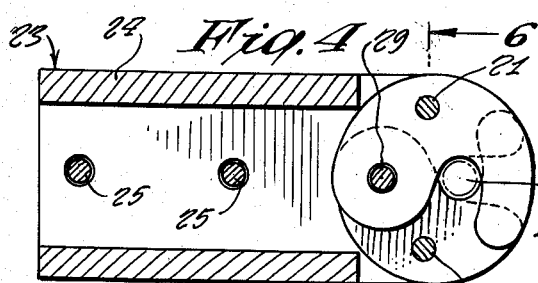
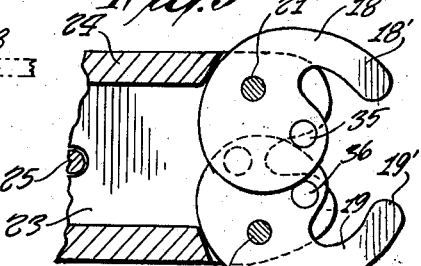
INVENTOR.
LESLIE WALTER CAUGHMAN
BY
Carl Miller
ATTORNEY Patented Apr. 8, 1952

2,591,916

UNITED STATES PATENT OFFICE 2,591,916

SELF-LOCKING TRAILER COUPLING UNIT

Leslie Walter Caughman, Buena Vista, Colo.

Application June 10, 1950, Serial No. 167,339

2 Claims. (Cl. 280—33.15)

This invention relates to a self-locking trailer coupling unit.

It is an object of the present invention to provide a self-locking trailer coupling unit adapted to be attached to an automobile bumper and to the end of a trailer tongue by simple securing means and wherein the parts of the same can be disassembled or detached from one another by simple lifting of a pin carried by one of the parts and wherein when the parts are brought together, the pin can automatically drop into place into the movable elements whereby to lock the same about a vertically extending post upon the coupling part which is secured to the automobile bumper.

Other objects of the present invention are to provide a self-locking trailer coupling unit which is of simple construction, inexpensive to manufacture, has a minimum number of parts, compact, consumes little space, easy to install, and efficient in operation.

For other objects and for a better understanding of the invention, reference may be had to the following detailed description taken in connection with the accompanying drawing, in which:

Fig. 1 is a side elevational view of a trailer and of an automobile and of the self-locking unit embodying the features of the present invention.

Fig. 2 is an enlarged perspective and collective view of the coupling unit parts detached from one another.

Fig. 3 is a longitudinal sectional view of the part which is connected to the trailer.

Fig. 4 is a horizontal sectional view taken on line 4—4 of Fig. 3.

Fig. 5 is a view similar to Fig. 4 but with the pivotable locking parts angled outwardly from one another.

Fig. 6 is a transverse sectional view taken on line 6—6 of Fig. 4.

Referring now to the figures, 10 represents an automobile having a bumper 11 on the rear thereof. To this bumper 11 there is connected a coupling part 12 by means of a clamping plate 13 and fastening bolts or screws 14 disposed between the part 12 and the plate 13 above and below the bumper 11. The part 12 has horizontally extending vertically spaced portions 15 and 16 between which extends a post 17. This post extends vertically and is adapted to be grasped by movable locking elements 18 and 19 which are respectively pivotally connected by pins 21 and 22 upon a plate assembly 23 having spacing elements 24 therewithin. The assembly 23 is connected by bolts 25 to tongue 26 of trailer 27.

On the plate assembly 23 is a vertically extending tubular projection 27' having a notch 28 in the upper end thereof and through which is slidable a pull pin 29 having a horizontal lifting portion 31 on its upper end. Surrounding the drop pin 29 is a tension spring 32 which is anchored to the pin at 33 and to the lower end of the tubular projection 27' at 34. This spring urges the pin downwardly against the movable locking elements 18 and 19.

The locking elements are generally of crescent shape and have end projecting portions 18' and 19' of the respective elements which will overlap one another, in the manner as shown in Fig. 4, so as to confine and retain the post 17 of the part 12. To prevent the opening of the movable elements, there are provided respectively holes 35 and 36 through which the pin 29 may be extended in the manner as shown in Fig. 4 to lock the projections 18' and 19' over one another. The bottom plate of the assembly 23 has a notch 38 into which the post 17 projects. The upper plate of the plate assembly has a notch 40. As the elements 18 and 19 are pivoted, the pin 29 will find the openings 35 and 36 in the elements whereby to lock the elements against outward displacement. By a mere pulling of the pin 29 outwardly and angling so that its handle 31 rests on the top edge of the tubular projection 27', the pin 29 will be held in its retracted position and the movable elements 18 and 19 will be free to angle outwardly or inwardly.

While various changes may be made in the detail construction, it shall be understood that such changes shall be within the spirit and scope of the present invention as defined by the appended claims.

Having thus set forth and disclosed the nature of my invention, what is claimed is:

1. A self-locking coupling unit comprising a part adapted for connection to an automobile and having a vertically extending post, a second part adapted for connection with a trailer and comprising a plate assembly, pivotable locking elements pivotally connected to the plate assembly and having projections adapted to overlap one another and to surround the vertically extending posts of the one part, and a pin adjustable on the plate assembly, said movable locking elements having openings therein adapted to receive said pin whereby to lock the elements against angular displacement after engagement about the vertically extending posts of the one part, and said plate assembly having a tubular projection in which said pin is vertically adjustable, said tubular projection having its upper end notched, said pin having a handle portion adapted to extend through the notch of the tubular projection whereby to permit the lowering of the pin through the openings in the movable locking elements, and spring means acting between the pin and the tubular projections for normally urging the pin downwardly toward the movable elements.

2. A self-locking coupling unit comprising a part adapted for connection to an automobile and having a vertically extending post, a second part adapted for connection with a trailer and comprising a plate assembly, pivotable locking elements pivotally connected to the plate assembly and having projections adapted to overlap one another and to surround the vertically extending posts of the one part, and a pin adjustable on the plate assembly, said movable locking elements having openings therein adapted to receive said pin whereby to lock the elements against angular displacement after engagement about the vertically extending posts of the one part, and said plate assembly having vertically spaced notches for receiving the vertically extending post upon the movable elements being moved into position for locking engagement by said post.

LESLIE WALTER CAUGHMAN.

REFERENCES CITED

The following references are of record in the file of this patent:

UNITED STATES PATENTS

| Number | Name | Date |
|---|---|---|
| 844,522 | Johnson | Feb. 19, 1907 |
| 1,576,803 | Anderson | Mar. 16, 1926 |
| 2,245,270 | Goode | June 10, 1941 |

FOREIGN PATENTS

| Number | Country | Date |
|---|---|---|
| 256,299 | Italy | Dec. 19, 1927 |
| 622,426 | Great Britain | May 2, 1949 |